United States Patent

[11] 3,627,013

[72] Inventors: David William Chase, Stow; Robert Charles Purcell, Akron, both of Ohio
[21] Appl. No. 848,613
[22] Filed Aug. 8, 1969
[45] Patented Dec. 14, 1971
[73] Assignee The Firestone Tire & Rubber Company, Akron, Ohio

[54] PNEUMATIC TIRE
4 Claims, 1 Drawing Fig.

[52] U.S. Cl. .................................................. 152/361, 152/359
[51] Int. Cl. .................................................. B60c 9/18
[50] Field of Search ..................................... 152/356, 359, 361

[56] References Cited
UNITED STATES PATENTS

| | | | |
|---|---|---|---|
| 2,132,492 | 10/1938 | Parker | 57/140 |
| 2,943,663 | 7/1960 | Antonson | 152/356 |
| 3,469,614 | 9/1969 | Kobayashi | 152/355 |
| 2,058,778 | 10/1936 | Dinsmore | 152/359 |

Primary Examiner—Arthur L. La Point
Assistant Examiner—R. Saifer
Attorneys—S. M. Clark and D. A. Thomas ABSTRACT: This disclosure is related to a novel tire construction comprising a conventional body construction of layers of conventional body plies with the cords of each ply at conventional angles and a belt of plies with the cords in the belt at an angle different from the cords in the body plies and the cords comprised of regular modulus, low twist rayon cords. The twist of the rayon cord is between 40 and 75 percent of the standard twist and preferably 50 percent of the standard twist.

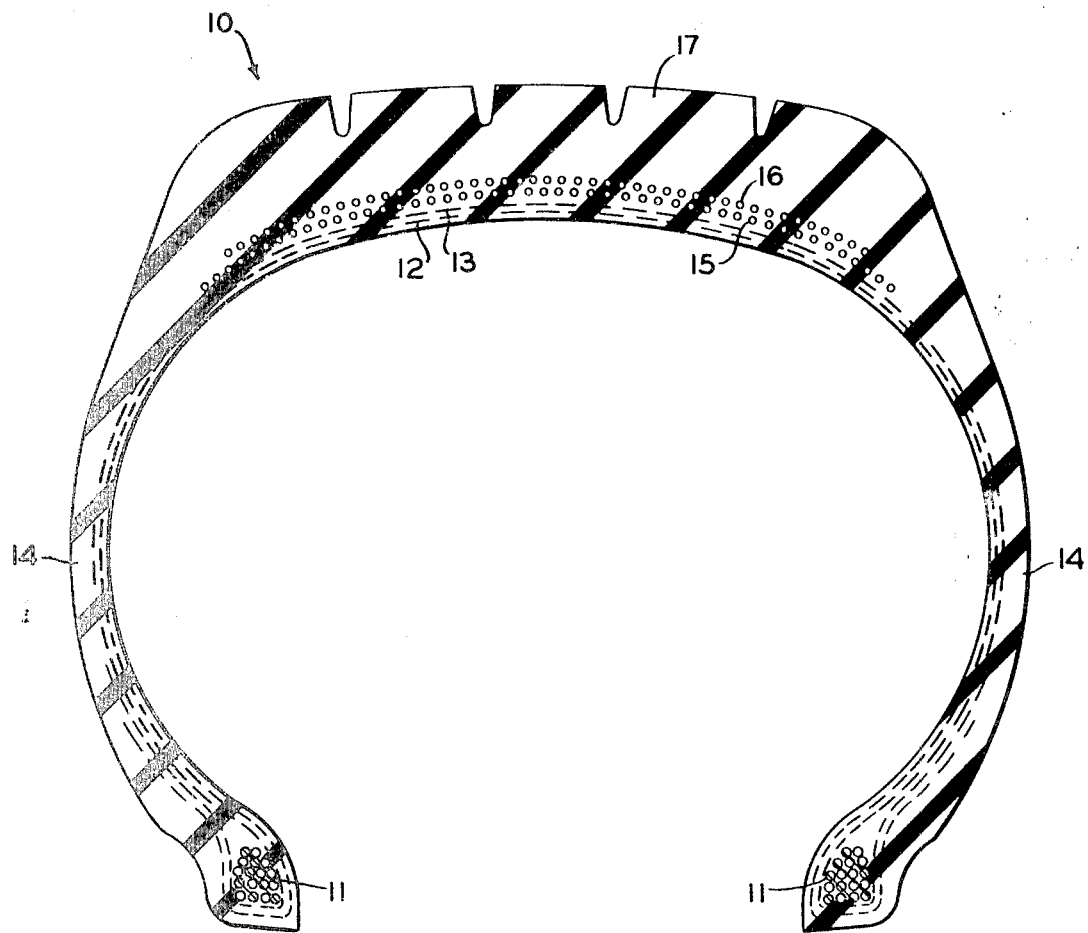

PNEUMATIC TIRE

DISCUSSION OF PRIOR ART

The standard radial ply tire (a tire in which the cords in the body plies run at an angle of 90° to the circumferential centerline of the tread of the tire and with the cords in the belt running at low angles to the circumferential tread centerline (less than 45° depending upon the type of cord utilized for the belt) although popular in Europe for many years, has just recently been seriously considered for the United States. The advantages of the radial ply construction are well documented; however, the disadvantages of harsher ride, cost of manufacture and improper automobile suspension have been drawbacks to the commercial acceptance of radial ply tires in the U. S.

A compromise of the radial ply principle has obtained great recent interest. This compromise is the belted-bias tire in which the body is constructed of standard plies of standard materials at standard angles and the belting material is constructed of glass cords. This belted-bias tire has the advantage of easier manufacturing over the radial tire but has certain commercial drawbacks. For example, the ride characteristics of the glass belted-bias tire are not as good as a conventional bias tire, although better than a radial tire; the cost of manufacture and materials of the glass belted-bias tire are greater than a conventional tire and approach a radial tire; the retreadability of the glass belted-bias tire is very poor and is worse than a radial tire (it is felt that the glass belted-bias tire will be a serious problem to the retread industry); and there have been instances in which the glass cord in the belts have broken in service.

Although rayon has been recommended and utilized as the belting material in certain radial ply tires, it has not been utilized as the belting material in the belted-bias tires. As a matter of fact, it has been the position of some tire companies that a rayon belt in a belted-bias tire is very undesirable, even though a raw material supplier has recommended the use of a "high modulus" rayon as the cord in a belted-bias tire. Specifically, the industry's thinking is reflected by the following quote on Page 34 of the Apr., 1966 issue of Rubber World:

"Synthetic fibers such as rayon and nylon do not give sufficient support (rigidity) to the breaker portion of conventional bias-angled tread plies, with the consequence that these tires wore quickly. Dimensional instability, therefore, ruled out these materials. These fibers, however, are able to function effectively with ply cords having low or zero crown angles (as with radicals)—this is the angle the ply cords make with an (imaginary) radial line about the tire."

BACKGROUND OF THE INVENTION

This invention relates to a novel construction for a belted-bias tire in which the body is comprised of two or more plies of standard tire cord material with the cords in the plies at conventional (approximately 30° to 45°) angles to the circumferential tread centerline and the belt is comprised of two plies of a standard modulus rayon tire cord having a low twist and having an angle of approximately 26° to the circumferential tread centerline. The industry standard for rayon cord is considered to be a 1650/3 construction with a 10×10 twist. In these designations the 1650/3 indicates that fabric is a cable comprised of three plies of 1650 denier cord. The 10×10 twist indicates that each of the three individual cords has 10 turns per inch in one direction and the composite cable has these three cords twisted at 10 turns per inch in the other direction. The applicants have found by utilizing a standard modulus rayon cord having a twist in the range of 4×4 to 7.5×7.5 and preferably 5×5 that they are able to manufacture a belted-bias tire with this "low twist" cable in the tread ply belt and that the tire has better ride characteristics than the glass belted tire, is much easier to manufacture, is easily retreadable, has at least equal wear to the glass belted tire, and is not subject to the catastrophic failure which some glass belted tires have indicated. By way of example a 4×4 twist is a cable in which each individual cord has four turns per inch and the cords are wrapped around each other so that they each as a whole have four turns per inch in the cable.

Basically, the applicants have determined that a twist that is 50 percent of the normal twist recognized by the industry gives the best performance as the belting material in a belted-bias tire; therefore, if a lighter cord construction were utilized, such as an 1100/2 construction, the preferred twist would be 50 percent of the regular twist of this cable; that is, with the regular twist of this cable being either 14×14 or 15×15, the preferred twist would be 7×7 or 7.5×7.5.

The applicants have determined that as the number of twists per inch in a rayon cable increase, the cable becomes more flexible and less like the inextensible and compression resistant glass cable. Also, as the number of twists per inch in a rayon cable progressively decrease, the cable becomes more inextensible and more resistant to compression and, therefore, approaches the physical characteristics of a glass or metal material. However, if the number of twists per inch in the rayon cable is decreased to too low a value, the cable loses its resistance to compression fatigue with a resulting fracture of the cords on repeated compression cycles. Therefore, the applicants have found that the twist must be within the previously set out specific range to get an acceptable tire; if the twist is too high, the belt will not have the proper characteristic stiffness to give the necessary support to the tread area of the tire and the resulting good tread wear, and if the twist is too low, the cable will lose its compression fatigue resistance and will be an unsuitable tire cable material.

It is, therefore, an object of this invention to provide a belted-bias tire with the cord material in the belt plies being a regular modulus, low twist rayon cord which results in a tire that is more economical, easier to manufacture, is easily retreadable, has improved ride characteristics, and has improved tread life over a conventional bias built tire and tread life comparable to a glass belted tire.

TECHNICAL DISCLOSURE OF THE INVENTION

The FIGURE is a cross-sectional view of the tire embodying the novel construction of this invention.

Referring to the FIGURE, the tire is generally designated as 10 and is comprised of standard tire beads 11, body plies 12 and 13, sidewalls 14, tread belt plies 15 and 16 and 17. The body plies may be comprised of cords of any of the well known tire fabrics, such as rayon, nylon or polyester, but preferably of rayon and are constructed in standard construction well known in the art. The angles of each of the cords in the body plies is a conventional angle for a bias tire, that is, between 30° and 45° to the circumferential tread centerline of the tire.

The tread belt plies are comprised of a standard modulus rayon material but with a low twist construction. The cords in the belt plies have an angle in the range of 21° to 35° to the circumferential tread centerline of the tire. The angle of cords in the tread belt plies is preferably lower than the angle of cords in the body plies but may be the same as the angle of the body plies and is never greater than the angle in the body plies. An accepted industry definition for a "high modulus" rayon cord is that the elongation must be at least 25 percent lower than the elongation of a regular tire yarn at any given test load. These modulus definitions, although somewhat ambiguous to a layman, are well suited and well known to persons skilled in the art so that no ambiguity can occur by defining a tire cord as having a regular modulus.

The lower twist treatment that is utilized in the cords of the belting material in this construction is in the range of 40–75 percent of the conventional twist and preferably 50 percent of the conventional twist. The industry standard rayon cable constructions are 1100/2 with a 14×14 or 15×15 twist; 1650/2 with a 12×12 twist; 1650/3 with a 10×10 twist; and 2200/3 with an 8.5×8.5 twist. The fabric utilized in the belt plies of this invention has the standard yarn (regular modulus) but the twist treatment of the cable is approximately one-half of the standard twist; that is, for an 1100/2 cable, the twist for this invention would be 7×7 or 7.5×7.5; for a 1650/2, the twist would be 6×6; for a 1650/3, the twist would be 5×5; and for a 2200/3, the twist would be 4.25×4.25.

The fabric ply constructions of both the body plies and the belt plies are standard in that each has all of its strength in one direction with the cords being held in place by a standard pick cord which, of course, gives no strength in the direction of the pick cord. The tire is constructed in a standard way with the adjacent plies having the cords at an angle of 90° to the cords in the next ply; that is, the first body ply would have cords with angles of 32° to the left, and the second body ply would have cords with angles of 32° to the right, and so on through the number of plies. This alternation also holds true for the belt construction.

Tables I, II and III below set out the test data which clearly shows the utility of this invention. In these tests, belted-bias tires containing either glass cords or rayon cords in the belt were evaluated against each other and, in some instances, against standard original equipment two-ply polyester controls. Table I sets out a tire test summary showing that the rayon belt in a belted-bias tire construction has significant advantages over the glass belted-bias construction in that the rayon belted tire exhibits higher plunger strength, comparable power loss and equal high speed performance.

least equal to the glass belted tire and perhaps somewhat better.

TABLE II

Tread Wear—Controls standard original equipment 2 ply polyester.

| Position | ENSM* | Tread wear rating Control as Par | Glass as Par |
|---|---|---|---|
| H78–15 at 16,000 miles | | | |
| Controls RR | 33,200 | 100 | |
| LR | 33,200 | 100 | |
| RF | 38,900 | 100 | |
| LF | 38,900 | 100 | |
| Rayon Belt RR | 46,300 | 139 | 104 |
| LR | 46,300 | 139 | 104 |
| RF | 48,000 | 123 | 111 |
| LF | 48,000 | 123 | 111 |
| Glass Belt RR | 44,800 | 135 | 100 |
| LR | 44,800 | 135 | 100 |
| RF | 43,400 | 112 | 100 |
| F70–14 at 8,000 miles | | | |
| Controls RR | 32,400 | 100 | |
| LR | 32,400 | 100 | |
| RF | 42,000 | 100 | |
| LF | 42,000 | 100 | |
| Rayon Belt RR | 44,800 | 138 | 111 |
| LR | 44,800 | 138 | 111 |
| RF | 64,000 | 153 | 100 |
| LF | 64,000 | 153 | 100 |
| Glass Belt RR | 40,500 | 125 | 100 |
| LR | 40,500 | 125 | 100 |
| LF | 64,000 | 153 | 100 |
| RF | 64,000 | 153 | 100 |

*Estimated nonskid mileage to wear indicator.

TABLE I

| Size | H78–15 | | F70–14 | |
|---|---|---|---|---|
| Construction | Glass belt | Rayon belt | Glass belt | Rayon belt |
| Body plies | 34° polyester | 34° polyester | 34° polyester | 34° polyester |
| Tread plies | 30° 75/7/1 glass | 30° 1650/3 regular modulus rayon 5×5 twist | 26° 75/7/1 glass | 26° 1650/3 regular modulus rayon, 5×5 twist |
| Plunger strength | 5,600 in./lbs | 6,000 in./lbs | 5,400 in./lbs | 7,200 in./lbs |
| Power loss: | | | | |
| 30 m.p.h. | 2.03 HP | 1.97 HP | 1.62 HP | 1.63 HP |
| 60 m.p.h. | 3.81 HP | 3.90 HP | 3.10 HP | 3.04 HP |
| High speed: | | | | |
| Ford test | 110 m.p.h. | 105 m.p.h. plus | 110 m.p.h. plus | 120 m.p.h. plus |
| Firestone Fleet, 100 miles at | 108 m.p.h. | 108 m.p.h. | 108 m.p.h. | 110 m.p.h. |
| Cleat test (belt cord breakage) | 2,200 miles, no breakage | 2,200 miles, no breakage | 2,200 miles no breakage | 2,200 miles no breakage |

Tables II and III set out the tread wear data and ride characteristics, respectively, showing that the rayon belted tire wears at least as well as the glass belted tire and has better ride aesthetics. Specifically, the data in Table II shows both the glass belt and rayon belt tires to have significantly better wear than the standard two-ply control tire as seen in the tread wear rate column entitled "Control as Par." In this instance, the wear rating is based upon the control as 100. Under the tread wear rating column entitled "Glass as Par," the glass belted tire is graded as 100. This test data indicates that the rayon belted tire, if anything, has a better wear rating than the glass belted tire. In these tests, the tread flatness is comparable between the rayon belted tire and the glass belted tire; it is anticipated that, due to the slightly greater rigidity of the glass belted tire, the glass belted tire may give a tire with a slightly higher flatness than the rayon belted tire. In this situation, it would be excepted that the glass belted tire might show a slight advantage over the rayon belt; however, with equal flatness, as these tests show, the rayon belted tire should be at Table III sets out a comparison between the rayon belted-bias and the glass belted-bias tire. In this comparison, an arbitrary scale for the ride characteristics was established using a rating system in which a higher number indicates a superiority for the particular property; that is, in this system, a rating of 1 was considered noncommercial, 5—commercial, and 10—good so that a rating of 6 for a certain characteristic would indicate that the tire was better than another tire with a rating of 5 for the same characteristic.

TABLE III.—RIDE EVALUATION AT VARIOUS MILEAGES

| | Size belt construction | | | | | | | | | | | |
|---|---|---|---|---|---|---|---|---|---|---|---|---|
| | H78-15 | | | | | | F70-14 | | | | | |
| | Glass belt | | | Rayon belt | | | Glass belt | | | Rayon belt | | |
| Characteristic | Initial | 8,000 | 16,000 | Initial | 8,000 | 16,000 | Initial | 4,000 | 8,000 | Initial | 4,000 | 8,000 |
| Roughness | 7− | 6½ | 6 | 7½ | 6½ | 6− | 7 | 5½ | 5 | 6½ | 6½ | 6½ |
| Shake | 6½ | 5½ | 4 | 6½ | 6+ | 6½ | 6½ | 5 | 4 | 6 | 6½ | 6½ |
| Harshness | 6 | 6 | 6− | 6½ | 6+ | 6½ | | | | | | |
| Stability: | | | | | | | | | | | | |
| Directional | 7 | 7 | 7 | 7½ | 7½ | 7+ | 7 | 6½ | | 7 | 7 | |
| Transitional | 7− | 6½ | 6½ | 7− | 7− | 7 | 7½ | 7½ | | 7 | 7 | |
| Total ride | 6½ | 6 | 4 | 7 | 6½ | 5+ | 5 | 5 | | 6 | 6 | |

A specific example of the tire construction of this invention in a G78-15 passenger tire size comprises a tire which has two-body plies, each ply having cords of 2200/3 rayon with an 8.5×8.5 twist, each cord having an angle of 32° to the circumferential tread centerline with the first ply having its cords directed to the right and the second ply having its cords directed to the left. The two belt plies contain 1650/3 rayon cords with a 5×5 twist and each cord at an angle of 28° to the circumferential tread centerline, again the direction of the cords is alternated from the first ply to the second as in the standard construction. The rayon yarn used in the body plies and the belt plies is a standard regular modulus rayon yarn. Other than the low twist of the rayon cable utilized in the belt plies, the tire is of conventional constructions and is manufactured under conventional processing and techniques.

Although this specific example is directed to passenger car tires, it is understood that this construction may be utilized on tires for all vehicles; that is, on industrial, racing, truck, off-the-road and earthmover, and airplane tires, but this construction seems most suitable for passenger tires as, it is in these tires that the ride aesthetics are most important.

We claim:

1. A pneumatic tire of a belted-bias construction having a tire body comprised of body plies and a tread ply belt comprised of tread plies in which the parallel cords of the tread plies are 1650/2 rayon and have a twist in the range of 4.8×4.8 to 9×9 and in which the angle of the cords in the tread ply belt is equal to or less than the angle of the cords in the tire body plies.

2. A pneumatic tire of a belted-bias construction having a tire body comprised of body plies and a tread ply belt comprised of tread plies in which the parallel cords of the tread plies are 1650/3 rayon and have a twist in the range of 4×4 to 7.5×7.5 and in which the angle of the cords in the tread ply belt is equal to or less than the angle of the cords in the tire body plies.

3. A pneumatic tire of a belted-bias construction having a tire body comprised of body plies and a tread ply belt comprised of tread plies in which the parallel cords of the tread plies are 2200/3 rayon and have a twist in the range of 3.4×3.4 to 6.38×6.38 and in which the angle of the cords in the tread ply belt is equal to or less than the angle of the cords in the tire body plies.

4. A pneumatic tire of a belted-bias construction having a tire body comprised of body plies and a tread ply belt comprised of tread plies in which the parallel cords of the tread plies are 1100/2 rayon and have a twist in the range of 5.6×5.6 to 11.25×11.25 in which the angle of the cords in the tread ply belt is equal to or less than the angle of the cords in the tire body plies.

* * * * *

UNITED STATES PATENT OFFICE
CERTIFICATE OF CORRECTION

PO-1050 (5/69)

Patent No. 3,627,013     Dated December 14, 1971

Inventor(s) David William Chase & Robert Charles Purcell

It is certified that error appears in the above-identified patent and that said Letters Patent are hereby corrected as shown below:

Column 1, line 48, "radicals" should read --radials--

Column 3, Table I, second column, "110 m.p.h." should read -- 110 m.p.h. plus--

Column 3, line 54, "is" should read --was--

Signed and sealed this 23rd day of May 1972.

(SEAL)
Attest:

EDWARD M. FLETCHER, JR.
Attesting Officer

ROBERT GOTTSCHALK
Commissioner of Patents